Dec. 3, 1929.          J. O. GOODWIN          1,738,048
                          RUBBER HEEL
                       Filed April 18, 1929
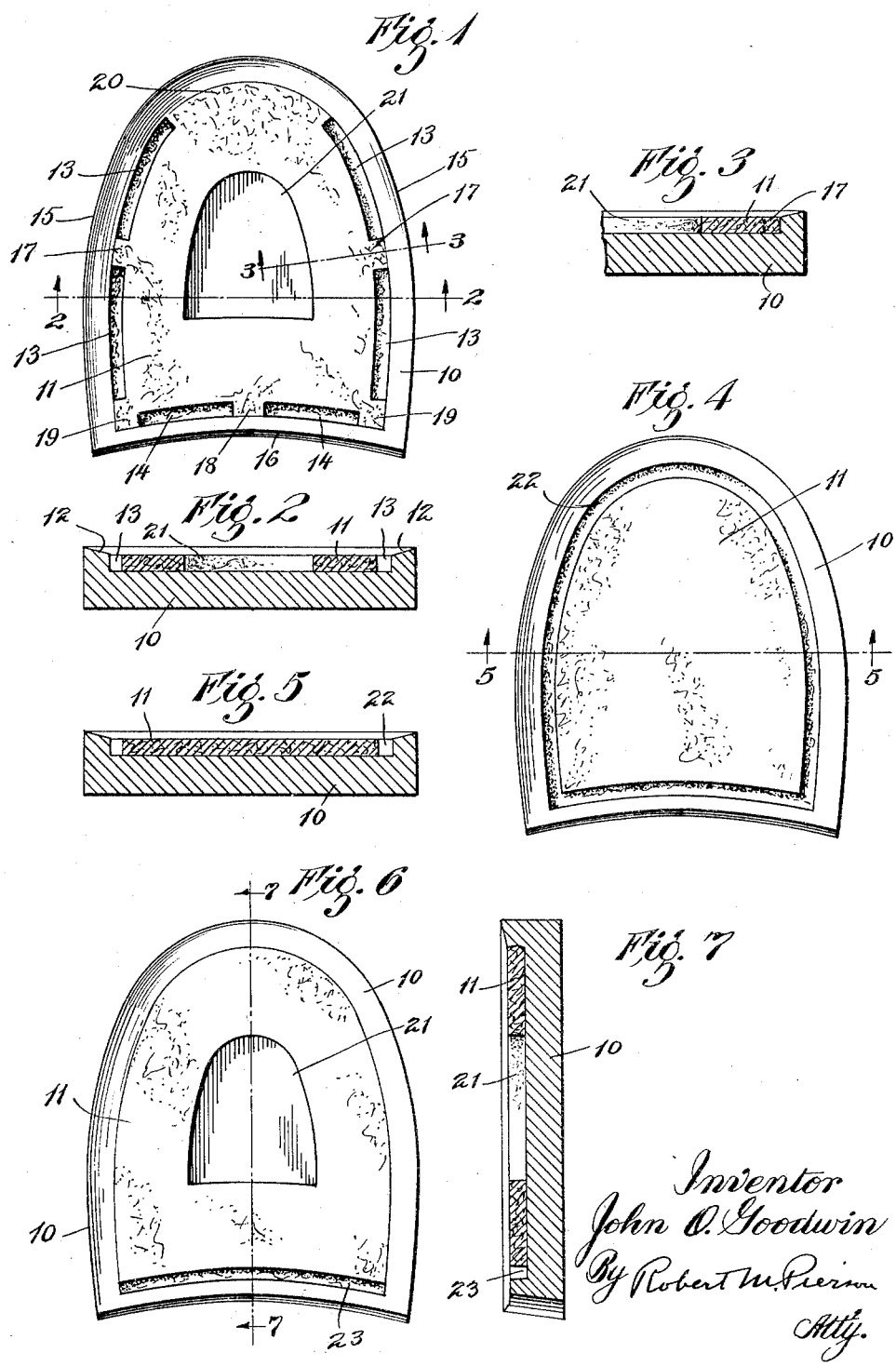
Inventor
John O. Goodwin
By Robert M. Pierson
Atty.

Patented Dec. 3, 1929

1,738,048

UNITED STATES PATENT OFFICE

JOHN O. GOODWIN, OF AKRON, OHIO, ASSIGNOR TO SEIBERLING RUBBER COMPANY, OF BARBERTON, OHIO, A CORPORATION OF DELAWARE

RUBBER HEEL

Application filed April 18, 1929. Serial No. 356,003.

This invention relates to rubber heels of the type including a nail-retaining layer, and particularly such a layer of non-metallic material, incorporated with the rubber cushion body.

In the manufacture of such heels as practiced prior to my invention, some difficulty has been encountered in keeping the attaching layer properly positioned in the heel body, especially when such layer is made of a plastic material such as rubber combined with a stiffening agent, the inset material sometimes flowing to the edges of the heel due to the softening action of the heat and the pressure involved in the molding operation, and thus producing defective heels. It is the object of my invention to provide a heel having certain novel and useful characteristics as hereinafter pointed out, which may be produced by a method avoiding the difficulty referred to.

The method herein disclosed is claimed in my application, Serial No. 397,900, filed Oct. 7, 1929.

Of the accompanying drawings, Fig. 1 is a top plan view of a heel made according to my invention.

Fig. 2 is a section on the line 2—2 of Fig. 1.

Fig. 3 is a section on the line 3—3 of Fig. 1.

Fig. 4 is a top plan view showing a modification.

Fig. 5 is a section on the line 5—5 of Fig. 4.

Fig. 6 is a top plan view showing a second modification.

Fig. 7 is a section on the line 7—7 of Fig. 6.

Referring at first to the form of my invention shown in Figs. 1 to 3, 10 is a vulcanized, soft-rubber heel body, and 11 is a nail-head retaining layer embedded or inset in the upper side of said body, on which is formed the attaching face of the heel. Said attaching face is preferably slightly dished or concave and provided with beveled or upwardly inclined edge lips 12 on the cushion body 10 to form a tight edge closure against the shoe bottom. The layer 11 may be of any suitable composition, preferably including vulcanized soft rubber to render said layer flexible, readily perforable by the attaching nails, and more or less resilient, and enable it to be integrally vulcanized to the rubber cushion body 10. The rubber of this layer is preferably stiffened with an intermixture of a suitable organic, fibrous material such, for example, as animal hair.

Located outside of the nailing zone which surrounds the central portion of the attaching face, along the outer edges of the attaching layer 11, are a series of elongated recesses 13, 14 parallel respectively to the outer side edges 15 and the forward or breast edge 16 of the heel. Two such recesses are shown on each side, separated by relatively short bridges or solid portions 17 of the material of layer 11, flush with the upper face of said layer and integrally united with the side marginal portions of the rubber body 10. Two of such recesses 14 are also located along the breast edge and interrupted by a similar bridge 18, while the ends of adjacent recesses 13 and 14 are separated by short corner bridges 19. The members of each pair of recesses 13 or 14 collectively occupy the major portion of the corresponding edge of the attaching layer along which they extend. A longer bridge 20 of the material of layer 11 integrally connects the latter with the marginal portion of the rubber body 10 adjacent the rear edge of the heel, and occupies substantially the entire rear edge of the attaching layer, to furnish a strong bond at this point for withstanding the greater strain at the rear edge. I have further shown a recess 21 in the center of the attaching layer 11, with its edges parallel to the outline of the heel, and surrounded by the nailing zone, said recess preferably extending clear through or perforating the layer 11, and being formed in the blank for said layer before placing in the mold.

The recesses 13, 14 and 21 correspond to mating projections on one of the plates of the heel mold, which projections serve to anchor the material of the attaching layer 11 during the molding operation and prevent it from floating or displacing laterally due to the softening and pressure incident to said operation. It has been found that if only the mold projection mating with a central recess such as 21 is provided, there is still some tendency, particularly with a rather soft stock, for the material of the attaching layer to flow to one or more edge faces of the heel, especially the breast edge. This tendency is counteracted at the side edges by the mold projections for forming the recesses 13, and at the breast edge by those for forming the recesses 14. When the mold projections corresponding to the recesses 13 and 14 are provided for externally anchoring the layer 11, there is less necessity for a mold projection corresponding to the recess 21, and the latter may be omitted, but its presence involves some saving of material, and the external and internal confining projections coact by mutually relieving each other of some of this anchoring duty.

The recesses 13, 14 also involve a saving of material and the resulting heel structure has some advantages over other heels in that less nailing pressure is required to bring the nailing zone against and retain it on the heel seat, the compression of the beveled lips 12 to preserve a tight edge-closure is more readily obtainable, the flexibility of the attaching layer and its integral union with the cushion body avoid separation between the two at the edges of said layer due to such compression, and greater cushioning is provided at the heel edges adjacent these recesses.

The form of my invention shown in Figs. 4 and 5 differs from that previously described in the provision of a continuous channel or recess 22, completely surrounding the nail-retaining layer 11, between its outer edge and the marginal portions of the heel body 10, and also by omission of the central recess. This form involves a slightly cheaper mold construction, completely prevents any lateral flow of the material of the attaching layer during molding, and provides greater edge cushioning all around, with no edge bonding of said layer to the marginal portions of the rubber body 10.

In the modification shown in Figs. 6 and 7, a single recess 23, of the full length of the forward edge of the attaching layer 11, is provided between said forward edge and the marginal portion of the rubber body 10 adjacent the breast edge, this being the place where the greatest tendency for the material of the attaching layer to flow to the edge of the heel is observed, such tendency being counteracted by the mold projection mating with recess 23. Any tendency toward lateral flow to the side edges may in this case be counteracted by a mold projection for forming a central recess 21, but said recess may be omitted if desired.

Other changes in the embodiment may be made without departing from my invention as herein claimed.

I claim:

1. A rubber heel comprising a rubber cushion body and a flexible non-metallic attaching layer incorporated therewith, said heel being formed with a recess in its attaching face, located immediately adjacent an outer edge of said attaching layer, and elongated longitudinally of said edge.

2. A rubber heel comprising a rubber cushion body, and a flexible, readily-perforable attaching layer incorporated therewith, said heel being recessed in its attaching face, adjacent an outer edge of said layer, for the greater part of the length of said edge, in a direction substantially parallel with the adjacent outer edge of the heel.

3. A rubber heel comprising a rubber cushion body, and an attaching layer of reinforced, flexible, resilient rubber composition integrally vulcanized thereto, said heel being recessed in its attaching face, along the breast edge of said layer, for the greater part of the length of said edge.

4. A rubber heel comprising a rubber cushion body, and a flexible, readily-perforable attaching layer incorporated therewith, said heel being formed with elongated recesses in its attaching face, extending alongside the outer side edges and breast edge of said layer.

5. A rubber heel comprising a rubber cushion body, and an attaching layer incorporated therewith, said heel being formed with a plurality of elongated recesses in its attaching face, extending immediately alongside an outer edge of said layer substantially parallel with the adjacent outer edge of the heel, and separated by solid portions shorter than said recesses, connecting the attaching layer with the heel body.

6. A rubber heel comprising a rubber cushion body and an attaching layer incorporated therewith, said heel being formed with a plurality of elongated recesses in its attaching face, extending alongside of each of the side edges and separated by relatively-short solid portions or bridges, and the ends of the two rearmost recesses being separated by a relatively-long solid portion or bridge including substantially the whole of the rear edge of said layer.

7. A rubber heel comprising a rubber cushion body, and a flexible, resilient attaching layer of rubber compound containing a stiffening material, integrally vulcanized to said body, said heel having an upwardly beveled marginal lip separated from the adjacent edge of the attaching layer by an elongated recess formed in the attaching face of the heel.

In witness whereof I have hereunto set my hand this 15th day of April, 1929.

JOHN O. GOODWIN.